US005146746A

United States Patent [19]

Nagai et al.

[11] Patent Number: 5,146,746

[45] Date of Patent: Sep. 15, 1992

[54] LOADING/UNLOADING CONTROL APPARATUS FOR INDUSTRIAL VEHICLES

[75] Inventors: Katsumi Nagai; Teruyuki Nishimyou, both of Kariya, Japan

[73] Assignee: Kabushiki Kaisha Toyoda Jidoshokki Seisakusho, Kariya, Japan

[21] Appl. No.: 807,765

[22] Filed: Dec. 6, 1991

Related U.S. Application Data

[63] Continuation of Ser. No. 612,193, Nov. 13, 1990, abandoned.

[30] Foreign Application Priority Data

Nov. 20, 1989 [JP] Japan ................................ 1-299679

[51] Int. Cl.[5] ............................................ F16D 31/02

[52] U.S. Cl. ........................................ 60/445; 60/427; 60/452; 60/459; 60/465; 91/361

[58] Field of Search ................ 60/443, 445, 427, 465, 60/452, 431, 459; 91/361

[56] References Cited

U.S. PATENT DOCUMENTS

| | | | |
|---|---|---|---|
| 4,137,716 | 2/1979 | Budzich | 60/445 |
| 4,199,942 | 4/1980 | Kasper | 60/445 X |
| 4,505,111 | 3/1985 | Okamoto et al. | 60/431 |
| 4,672,811 | 6/1987 | Yoshida et al. | 60/445 X |
| 4,693,081 | 9/1987 | Nakamura et al. | 60/445 X |
| 4,763,473 | 8/1988 | Ziplies et al. | 60/445 X |
| 4,807,518 | 2/1989 | Berchtold et al. | 91/361 X |
| 4,823,552 | 4/1989 | Ezell et al. | 60/445 X |
| 4,884,402 | 12/1989 | Strenzke et al. | 60/445 X |
| 4,930,992 | 6/1990 | Takeuchi et al. | 60/452 X |

*Primary Examiner*—Edward K. Look
*Assistant Examiner*—Todd Mattingly
*Attorney, Agent, or Firm*—Brooks Haidt Haffner & Delahunty

[57] ABSTRACT

A loading/unloading control apparatus for a industrial vehicle control the discharge capacity of a variable displacement type hydraulic pump in accordance with the detected result of the amount of load applied to a loading/unloading hydraulic actuator or with a manual setting by an operator, thereby to obtain the most suitable working speed of the actuator for loading/unloading operations.

9 Claims, 6 Drawing Sheets

LOADING/UNLOADING CONTROL APPARATUS FOR INDUSTRIAL VEHICLES

This application is a continuation, of application Ser. No. 07/612,193, filed Nov. 13, 1990.

FIELD OF THE INVENTION

The present invention relates to a loading/unloading hydraulic circuit used for industrial vehicles such as a fork lift truck, a shovel loader, etc., and, more particularly, to a loading/unloading control apparatus for controlling the working speed of a hydraulic actuator such as a lift cylinder.

BACKGROUND OF THE INVENTION

FIG. 1 schematically shows a general conventional loading/unloading hydraulic circuit in a fork lift truck. In such a hydraulic circuit, a fixed displacement type hydraulic pump 1 sucks up hydraulic fluid from an oil tank 3 to supply or discharge the hydraulic fluid to or from a lift cylinder 5 through a control valve 7.

In the above-mentioned hydraulic circuit, since the pump is usually a fixed displacement type, the lifting speed of a piston rod 9 of the lift cylinder 5, i.e., the lifting speed of a fork (not shown) attached to the piston rod 9, is generally constant whether the fork lift truck is under a load or not. This lifting speed is st so that it will be optimal when cargos are loaded on the fork. As a result, for example, while the fork lift truck is going to pick up a cargo from a high location, the lifting speed of the fork is comparatively low in spite of being unloaded, thereby generating needless waiting time and decreasing operating efficiency.

SUMMARY OF THE INVENTION

Accordingly, a primary object of the present invention is to provide a loading/unloading control apparatus which can control the working speed of a hydraulic actuator such as a lift cylinder, etc., to thereby reduce waiting time and improve operating efficiency.

Another object of the present invention is to provide a loading/unloading control apparatus which can automatically control the working speed of the hydraulic actuator in response to the amount of load applied to the actuator.

A further object of the present invention is to provide a loading/unloading control apparatus in which the working speed of the hydraulic actuator can be manually controlled.

Yet another object of the present invention is to provide a loading/unloading control apparatus in which the working speed of the hydraulic actuator can be either manually or automatically controlled.

Therefore, the present invention is directed to a loading/unloading control apparatus for an industrial vehicle comprising a variable displacement type hydraulic pump for supplying hydraulic fluid to a hydraulic actuator, the hydraulic pump having a displacement varying mechanism for regulating the discharge capacity of the pump, means for detecting the amount of load applied to the hydraulic actuator, and a controller for outputting a control signal to the displacement varying mechanism in response to a signal from the load detecting mean so as to decrease the discharge capacity of the hydraulic pump as the amount of load increases.

In the arrangement of such an apparatus, the discharge capacity of the pump is automatically regulated in response to the amount of load applied to the actuator. That is, under an unloaded condition, the discharge capacity of the pump is maximized to maximize the working speed of the hydraulic actuator. As a result, waiting time is reduced. On the other hand, under a loaded condition, since the discharge capacity of the pump is suitably decreased in accordance with the amount of load of the hydraulic actuator, the working speed of the actuator is optimal for the load or cargo weight.

Also, the present invention is directed to a loading/unloading control apparatus for an industrial vehicle comprising a variable displacement type hydraulic pump for supplying hydraulic fluid to a hydraulic actuator, the hydraulic pump having a displacement varying mechanism for regulating the discharge capacity of the pump, means for setting the working speed of the hydraulic actuator, and a controller for outputting a control signal to the displacement varying mechanism in response to a signal from the speed setting means so as to obtain the discharge capacity of the hydraulic pump corresponding to the speed set by the speed setting means.

In such an apparatus, when an operator manually inputs a desired speed to the speed setting means, the discharge capacity of the pump will correspond to the input value, and the hydraulic actuator can drive at the desired speed.

Further, the present invention is directed to a loading/unloading control apparatus for an industrial vehicle comprising a variable displacement type hydraulic pump for supplying hydraulic fluid to a hydraulic actuator, said hydraulic pump having a displacement varying mechanism for regulating the discharge capacity of the pump, means for detecting the amount of load applied to the hydraulic actuator, means for setting the working speed of the hydraulic actuator, a selector switch connected between the load detecting means and the speed setting means for selectively outputting a signal from either the load detecting means or the speed setting means, and a controller for outputting a control signal to the displacement varying mechanism in response to a signal from the selector switch, wherein the controller, when receiving a signal from the load detecting means, can output a control signal so as to decrease the discharge capacity of the hydraulic pump as the amount of load increases, and when receiving a signal from the speed setting means, output a control signal so as to obtain the discharge capacity of the hydraulic pump corresponding to the speed set by the speed setting means.

With this arrangement, manual or automatic speed control can be selected for more suitable loading/unloading control.

These and other objects and features of the present invention will become apparent from the following detailed description in conjunction with the attached drawings.

DETAILED DESCRIPTION OF THE INVENTION

Figure 1:
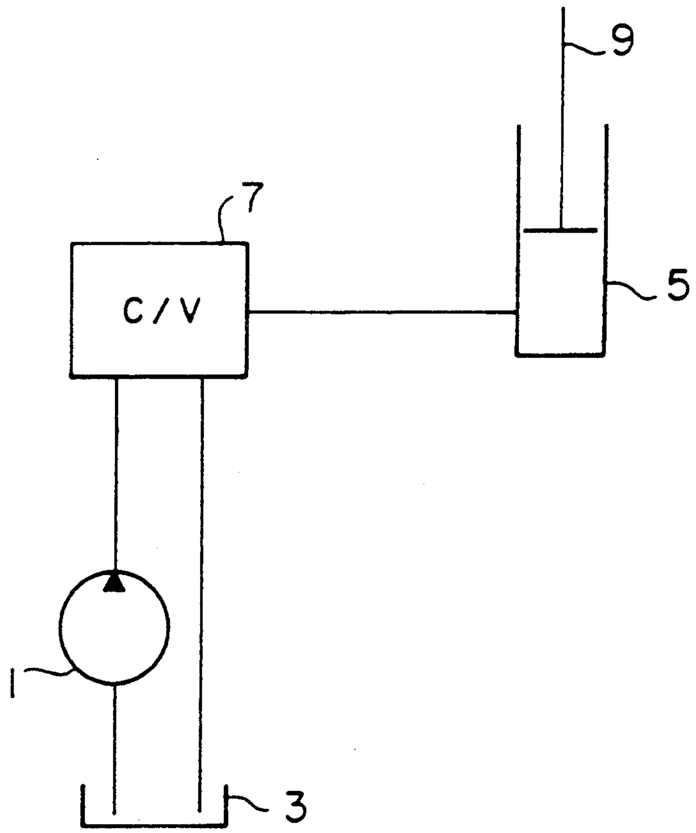
FIG. 1 PRIOR ART
FIG. 1 is a circuit diagram of a conventional loading/unloading hydraulic circuit of a fork lift truck.

In the following description, like reference characters designate like or corresponding parts throughout the several views.

Figure 2:
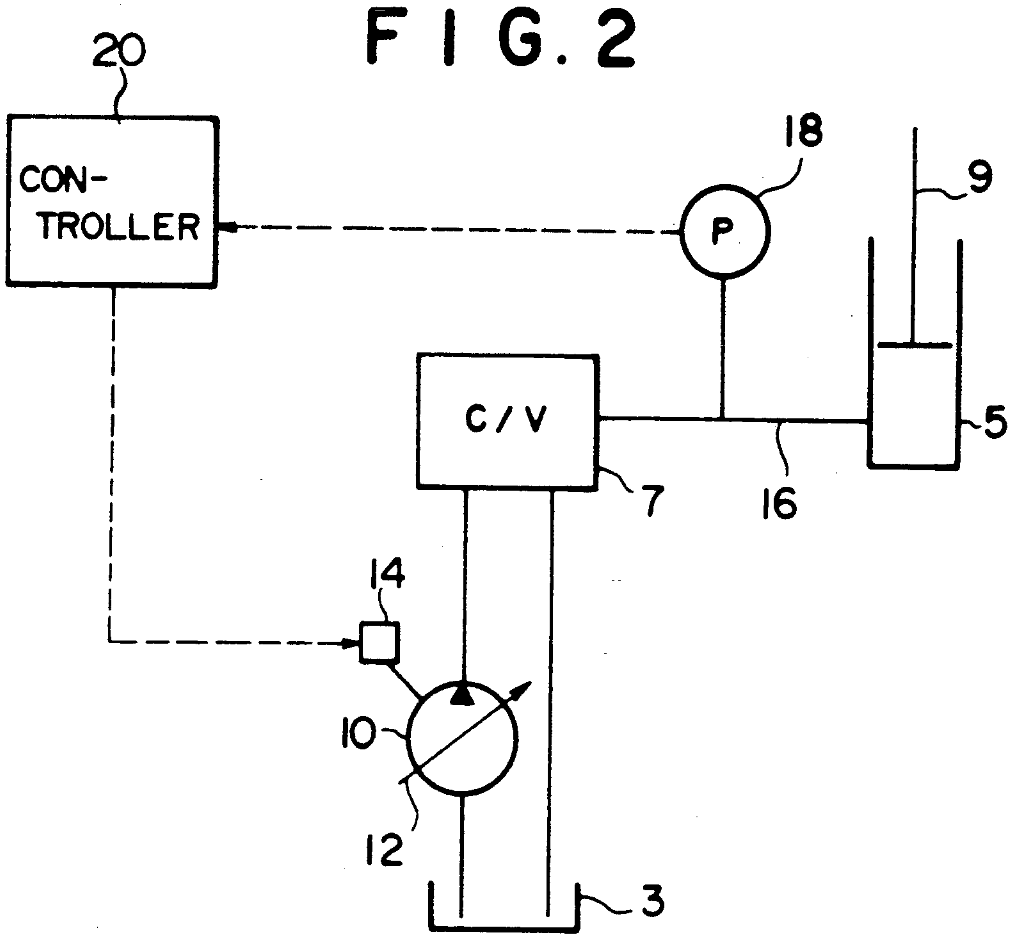
FIG. 2 is a circuit diagram of a loading/unloading hydraulic circuit of a fork lift truck to which a loading/unloading control apparatus according to a first embodiment of the present invention is applied.

Referring now to the drawings, and particularly to FIG. 2, a loading/unloading hydraulic circuit for a fork lift truck 60 (FIG. 8) incorporated with a loading/unloading control apparatus according to a first embodiment of the present invention is shown. This hydraulic circuit comprises an oil tank 7, a hydraulic pump 10 for sucking hydraulic fluid from the oil tank 3, a control valve 7 for controlling the flow direction of fluid discharged from the pump 10, and a lift cylinder 5 of the fork lift truck 60.

Figure 8:
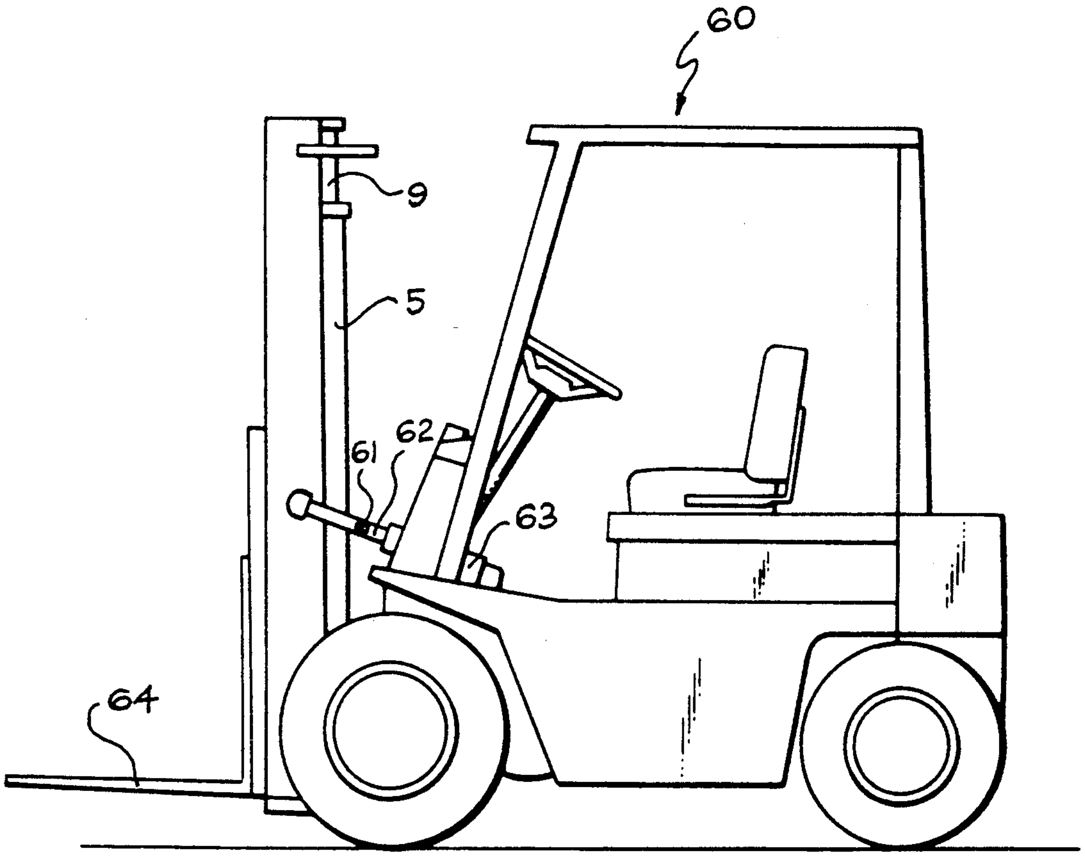
FIG. 8 is a side-elevational showing of a fork lift truck having a control apparatus in accordance with the invention.

In this embodiment of the present invention, the hydraulic pump 10 is a variable displacement type pump, preferably a swash plate type axial plunger pump which can vary discharge capacity of the pump by regulating the angle of a swash plate 12 by means of a displacement varying mechanism 14. A conduit 16 between the control valve 7 and the lift cylinder 5 is connected with a pressure detector 18 as means for detecting the amount of load applied to a piston rod 9 of the lift cylinder 5. However, it should be understood that the pressure detector 18 can be replaced with other suitable means for detecting the amount of load, for example a strain gauge fixed on a piston rod of a tilt cylinder 63 as shown in FIG. 8. The pressure detector 18 is connected to the input portion of a controller (e.g., a microcomputer) 20. The output portion of the controller 20 is connected to the displacement varying mechanism 14 of the hydraulic pump 10, and the controller 10 outputs control signals to the displacement varying mechanism 14 in response to the signals from the pressure detector 18 to regulate the angle of the swash plate 12.

Figure 3:
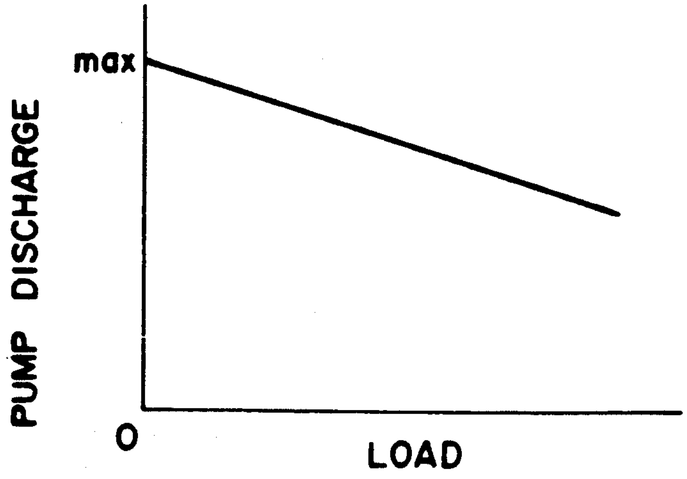
FIG. 3 is a graph showing the preferable relationship between the amount of load applied to a hydraulic actuator and the discharge capacity of a pump.

The pressure detector 18 can detect the pressure of hydraulic fluid in the conduit 16, the detected pressure corresponding to the amount of load applied to the piston rod 9 of the lift cylinder 5. Therefore, when signals from the pressure detector 18 are input to the controller 20, the controller 20 converts the signals into the amount of load applied to the piston rod 9. In the controller 20, data indicating the relationship between the amount of load and the discharge capacity of the pump as shown in FIG. 3 are previously stored, and the controller 20 determines a suitable discharge capacity of the pump from the amount of load on the basis of the stored data. Under unloaded conditions, the controller 20 outputs a control signal to the displacement varying mechanism 14 for maximizing the capacity of the pump 10. On the other hand, under loaded conditions, the controller outputs a control signal for varying the pump discharge capacity to the displacement varying mechanism 14 so that the pump 10 has a discharge capacity corresponding to the amount of load actually applied to the piston rod 9 to incline the swash plate 12 to a desired angle. As a result, the fork 64 as shown in FIG. 8 connected to the piston rod 9 of the lift cylinder 5 can move up at the maximum speed when it does not have any cargo. Also, when the fork is carrying cargo, it can move up at the most suitable speed for the weight of the cargo.

Figure 4:
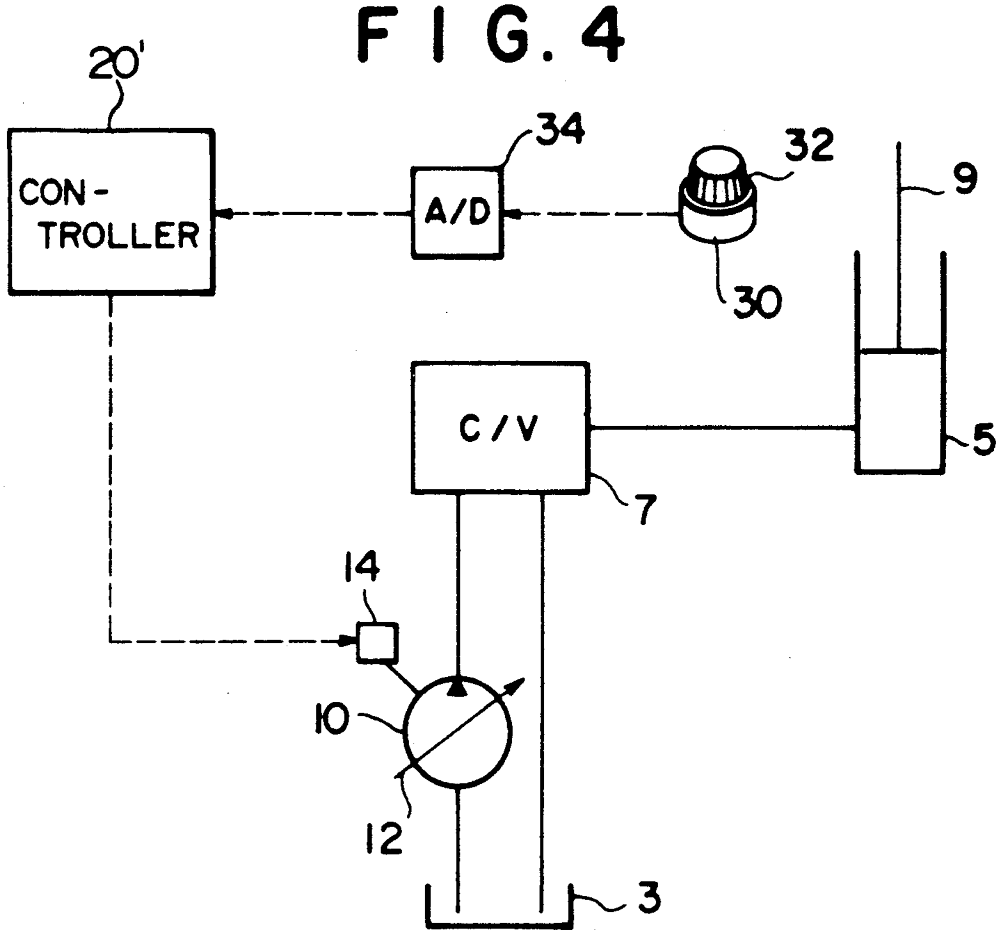
FIG. 4 is a circuit diagram of a loading/unloading hydraulic circuit of a fork lift truck to which a loading-/unloading control apparatus according to a second embodiment of the present invention is applied.

FIG. 4 shows a loading/unloading control apparatus according to a second embodiment of the present invention. The arrangement of this embodiment is the same as that of the first embodiment except that a variable resistor 30 is connected to the input portion of a controller 20' in place of the means for detecting the amount of load such as the pressure detector.

Figure 5:
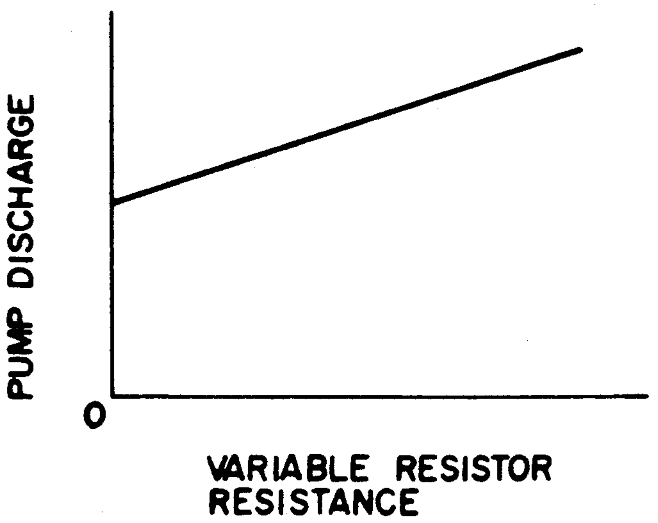
FIG. 5 is a graph showing the preferable relationship between the value of resistance of a variable resistor and the discharge capacity of a pump.

The variable resistor 30 is one means for manually setting the lifting speed of the fork. The variable resistor 30 can vary the value of resistance thereof by the rotation of a knob 32, the resistance value being digitized through an analog/digital converter 34 and inputted to the controller 20'. The controller 20' determines the value of resistance of the resistor 30 from the inputted digital signal, and the discharge capacity of the hydraulic pump 10 in accordance with the relationship as shown in FIG. 5. The controller 20' outputs a control signal to the displacement varying mechanism 14, whereby the hydraulic pump 10 has the determined discharge capacity. When the pump 10 is operated with this determined discharge capacity, the piston rod 9 of the lift cylinder 5 moves up at the speed corresponding to this discharge capacity of the pump and the lifting speed of the fork is the speed set by the knob 32 of the variable resistor 30.

Thus, although the working speed of the fork must be set by the operator, it is advantageous that the speed can be set depending on the kind of cargo. For example in case of fragile cargo such as glass, it is possible to minimize the working speed in order to prevent the breakage thereof.

In the second embodiment, the variable resistor 30 can be replaced with a digital switch as the means for setting the working speed.

Figure 6:
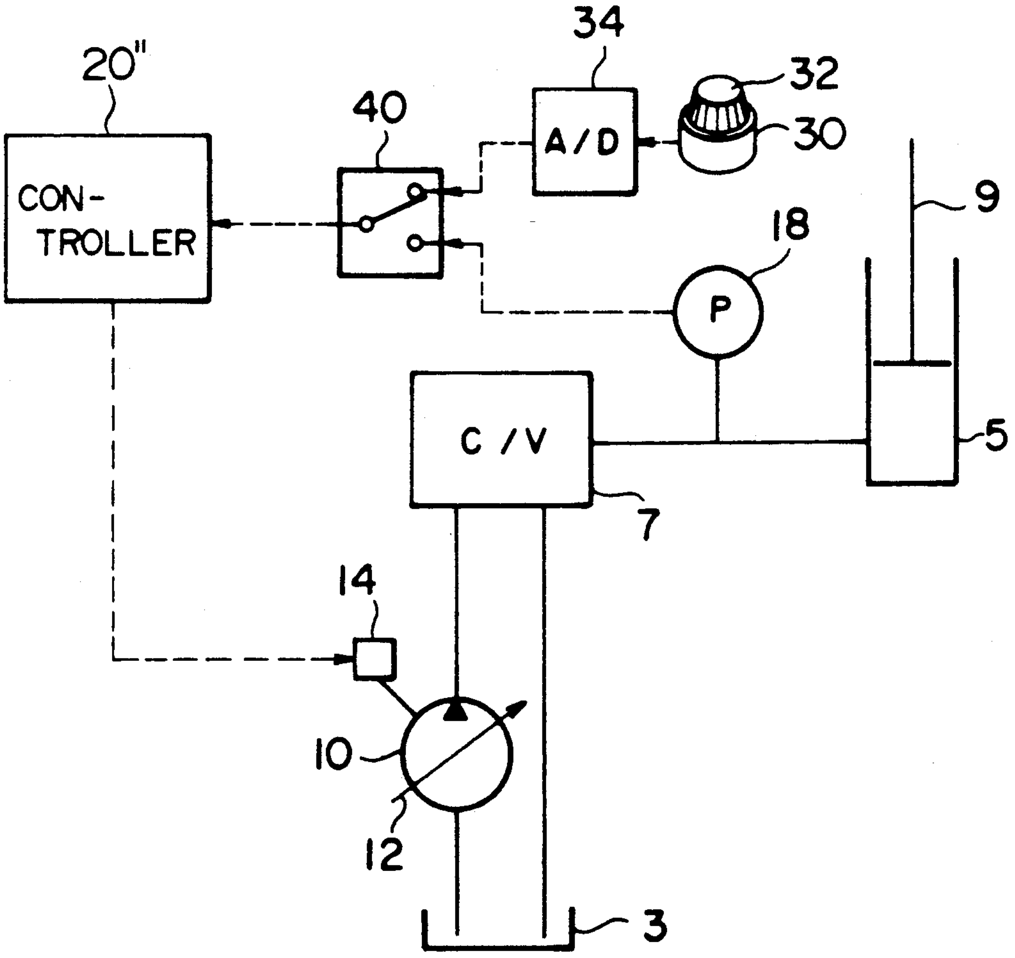
FIG. 6 is a circuit diagram of a loading/unloading hydraulic circuit of a fork lift truck to which a loading-/unloading control apparatus according to a third embodiment of the present invention is applied.

FIG. 6 shows a third embodiment of the present invention. The third embodiment includes a pressure detector 18 as the means for detecting the amount of load, a variable resistor 30 as the means for setting the working speed, and a selector switch 40 for selectively supplying the signals from either the pressure detector or the variable resistor to the input portion of a controller 20''. Therefore, it will be understood by the those skilled in the art that the lifting speed control of the fork can be selected from either automatic control in response to the amount of load or manual control by simply changing the selector switch 40.

In this way, the third embodiment has both features of the first and second embodiments as above mentioned, thereby covering various needs of the user.

Figure 7:
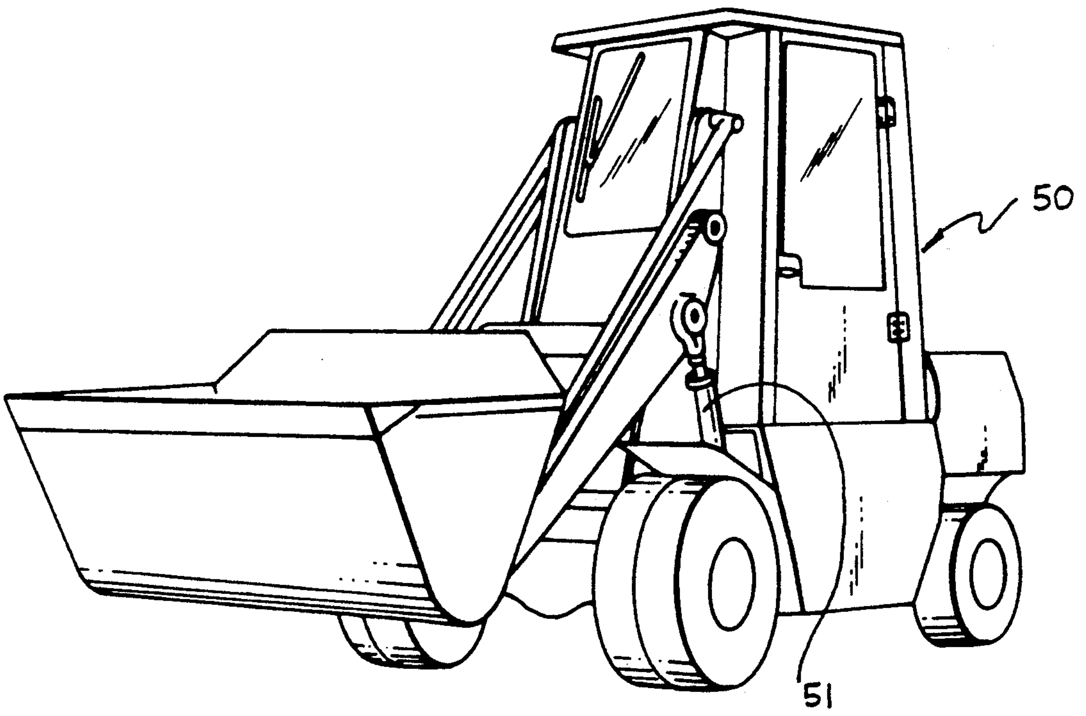
FIG. 7 is a perspective view of a conventional shovel loader in which a control apparatus in accordance with the invention may be installed.

Although all the above-mentioned embodiments are applied for controlling the working speed of the lift cylinder 5 of a fork lift truck 60 the present invention is not limited to this application. For example, the present invention may be applied to a tilt cylinder 63 of a fork lift truck 60 as illustrated in FIG. 8, or any hydraulic actuators of other industrial vehicles such as a dump cylinder 31 of a shovel loader 50 as illustrated in FIG. 7.

It is thought that the present invention and many of its attendant advantages will be understood from the foregoing description and it will be apparent that various changes may be made in the form, construction and arrangement thereof without departing from the spirit and scope of the invention.

What is claimed is:

1. A loading/unloading control apparatus for an industrial vehicle comprising a variable displacement type hydraulic pump for supplying hydraulic fluid to a hydraulic actuator, said hydraulic pump having a displacement varying mechanism for regulating the discharge capacity of said pump; means for detecting the amount of load of said hydraulic actuator; means for setting the working speed of said hydraulic actuator; a selector switch connected between said load detecting means and said speed setting means for selectively outputting a signal from either said load detecting means or said speed setting means; and a controller for outputting a control signal to said displacement varying mechanism in response to a signal from said selector switch, wherein said controller, when receiving a signal from said load detecting means, outputs a control signal so as to decrease the discharge capacity of said hydraulic pump as the amount of load increases, and when receiving a signal from said speed setting means, outputs a control signal so as to obtain the discharge capacity of said hydraulic pump corresponding to the speed set by said speed setting means.

2. A loading/unloading control apparatus according to claim 1, wherein said variable displacement type hydraulic pump is a swash plate type axial plunger pump.

3. A loading/unloading control apparatus according to claim 1, wherein said load detecting means is a pressure detector which is connected to a conduit between said hydraulic pump and said hydraulic actuator.

4. A loading/unloading control apparatus according to claim 1, wherein said industrial vehicle is a fork lift truck, and said hydraulic actuator is a lift cylinder.

5. A loading/unloading control apparatus according to claim 4, wherein said load detecting means is a strain gauge fixed on a piston rod of a tilt cylinder.

6. A loading/unloading control apparatus according to claim 1, wherein said industrial vehicle is a fork lift truck, and said hydraulic actuator is a tilt cylinder.

7. A loading/unloading control apparatus according to claim 1, wherein said industrial vehicle is a shovel loader, and said hydraulic actuator is a dump cylinder.

8. A loading/unloading control apparatus according to claim 1, wherein said speed setting means is a variable resistor.

9. A loading/unloading control apparatus for an industrial vehicle having an hydraulic actuator, said apparatus comprising a variable displacement type hydraulic pump for supplying hydraulic fluid to said hydraulic actuator, said hydraulic pump having a displacement varying mechanism for regulating the discharge capacity of said pump; means coupled to said actuator for detecting the amount of load on said hydraulic actuator; means for setting the operating speed of said hydraulic actuator; a selector switch connected between said load detecting means and said speed setting means for selectively outputting a signal from either said load detecting means or said speed setting means; and a controller having an input coupled responsively to said selector switch and having an output coupled to said displacement varying mechanism for outputting a control signal to said displacement varying mechanism in response to a signal from said selector switch wherein said controller, when receiving a signal from said load detecting means, outputs a control signal so as to decrease the discharge capacity of said hydraulic pump as the amount of load increases, and when receiving a signal from said speed setting means, outputs a control signal so as to obtain the discharge capacity of said hydraulic pump corresponding to the speed set by said speed setting means.

* * * * *